(12) United States Patent
Dixon, III

(10) Patent No.: US 6,587,834 B1
(45) Date of Patent: Jul. 1, 2003

(54) METHOD FOR PROMOTING INTEREST IN A WEBSITE

(76) Inventor: James W. Dixon, III, 1108 Arbor Hill Dr., Woodstock, GA (US) 30189

( * ) Notice: Subject to any disclaimer, the term of this patent is extended or adjusted under 35 U.S.C. 154(b) by 0 days.

(21) Appl. No.: 09/496,002

(22) Filed: Feb. 1, 2000

(51) Int. Cl.[7] .............................................. G06F 17/60
(52) U.S. Cl. ....................................................... 705/14
(58) Field of Search ........................................... 705/14

(56) References Cited

U.S. PATENT DOCUMENTS

| | | | | |
|---|---|---|---|---|
| 5,262,215 A | * | 11/1993 | Shields | 428/42.1 |
| 6,086,707 A | * | 7/2000 | Waller | 156/277 |
| 6,173,267 B1 | * | 1/2001 | Cairns | 705/14 |
| 6,317,722 B1 | * | 11/2001 | Jacobi et al. | 705/14 |
| 6,335,744 B1 | * | 1/2002 | Korilis et al. | 345/835 |

FOREIGN PATENT DOCUMENTS

WO      WO 99/40531      *  8/1999

OTHER PUBLICATIONS

Ray, Debra, "FASTBALL.com's Decode & Win Game", Direct Marketing, vol. 60, No. 7, Nov. 1997, p. 25(1).*
Amazon.com, two sheets copied from http://www.amazon.com on Nov. 27, 2002.*

* cited by examiner

*Primary Examiner*—Eric W. Stamber
*Assistant Examiner*—Donald L. Champagne
(74) *Attorney, Agent, or Firm*—Eric R. Katz

(57) ABSTRACT

A method, system and article of manufacture for promoting interest in a specific website on the Internet are disclosed wherein the article of manufacture, such as a book, is distributed in incomplete form with instruction that the missing part of the article of manufacture is obtained by accessing the website being promoted.

5 Claims, 3 Drawing Sheets

METHOD FOR PROMOTING INTEREST IN A WEBSITE

FIELD OF THE INVENTION

The present invention generally relates to a method, system and article of manufacture for promoting interest in a specific website on the Internet, and more particularly, to such a method and system utilizing an article of manufacture, such as a book, which is distributed in incomplete form and is completed by accessing the website being promoted where the missing part of the article of manufacture is obtained.

BACKGROUND

The advent of the Internet has increased the ability of businesses to make information available to their customers and the public in general. Corporations, manufacturers, advertisers, retailers, service providers and the like all have a need to provide customers, potential customers and the others with information about their products and companies. Retailers in particular need to provide consumers with product information to promote and support the products they distribute. In addition, product analysts, manufacturer's representatives, shippers, and others also need information about the companies, goods and services with which they deal. The Internet is an excellent medium to achieve the dissemination of such information due to the ease with which information on a website can be updated and tailored to a specific audience.

In addition to the foregoing, many Internet website owners generate revenue by posting advertisements on their website, for which they are paid by the sponsor based on the number of "hits" or visits to the website. In view of the foregoing, there is a need for devising a way to attract people to a particular website either to increase revenue from advertising and/or to provide information to consumers and customers regarding a particular product, corporation, movie, service or other promotional interests.

While the World Wide Web permits advertisers, corporations and business entities to make detailed, up-to-date information about products and businesses available via the Internet, the information is often difficult to locate, particularly if the URL (uniform resource locator) of the website entity is not generally known to the consumer or public. One prior art approach of making URL information easily available to the public is disclosed by U.S. Pat. No. 5,905,865 to Palmer et al. wherein the URL address is transmitted simultaneously with a radio or television broadcast. This address is received by a computer specially adapted to pick-up radio/television broadcasts and used to automatically access the on-line website. Such an approach requires special equipment that must be purchased by the consumer in order to be able to receive the URL information. Thus, in order for the owner of the website to use such an arrangement, reliance must be made on the use of equipment that is expensive and benefits only the website owner, as opposed to the consumer.

Another known technique for attracting interest in a specific website is by offering free services and software. Recently, free lottery opportunities have been offered by various websites, the winnings being paid for by the advertisers that sponsor that particular website. This approach is expensive and does not guarantee that the desired level of traffic will be achieved, but does require the payment of the lottery winnings regardless of the number of "hits" the website generates. In addition, this approach fails to make the URL information easily available to potential viewer which must still "surf" the Web in order to locate such a website.

SUMMARY OF THE INVENTION

Accordingly, it is an object of the present invention to provide a method, system and article of manufacture for promoting interest in a specific website on the Internet that is relatively inexpensive and easy to use.

Another object of the present invention is to provide a method and system for promoting interest in a specific website which utilizes an article of manufacture such as a book, which is distributed in incomplete form, as part of a promotion, for example, as a gift or award, or sold over the counter, and is completed by accessing the specific particular website on the World Wide Web at which the missing part of the article of manufacture is obtained.

One particular advantageous feature of the present invention is that it does not require the purchase of expense or specific equipment by the consumer in order to attract attention to a particular website.

Yet another advantageous feature of the present invention is that it can be used in connection with the promotion of a certain product or service as an incentive to link the public to a specific website associated with the promoted product or service so that additional information and/or advertising is provided to the public regarding the promotion.

These and other objects, advantages, and features of the present invention are achieved by a method of promoting interest in a particular website which comprises, according to one embodiment thereof, the steps of: connecting a computer to the Internet at a specific address, the computer storing a website with information which the owner of the website desires to be accessed by the public and distributing an article of manufacture, such as, for example, a book, in incomplete form to a recipient. With the distribution of the article of manufacture, the address of the website being promoted is provided along with instructions directing the recipient of the incomplete article of manufacture to access the website at the specific address on the Internet to obtain the missing part of the article of manufacture. The recipient then accesses the website and views, downloads and/or prints out the missing part of the article of manufacture.

The present invention also includes a system for promoting interest in a particular website on the Internet which comprises, according to one embodiment thereof, a computer connected to the Internet at specific address, on which the website to be promoted is stored. The system also includes an article of manufacture, such as, for example, a book or puzzle, which is distributed to a recipient in incomplete form as part of a promotion, for example, as a gift or award, or sold over the counter. With the incomplete article of manufacture are instructions directing the recipient to access the particular website that is being promoted in order to obtain the missing part of the incomplete article of manufacture.

According to preferred embodiments of the present invention, the incomplete article of manufacture comprises, for example, a book, a puzzle, a software program or any other article of manufacture having a missing part that can be supplied by accessing the website being promoted and viewing, downloading and/or printing out the missing part of the article of manufacture.

DETAILED DESCRIPTION OF THE PREFERRED EMBODIMENT(S)

Figure 1:
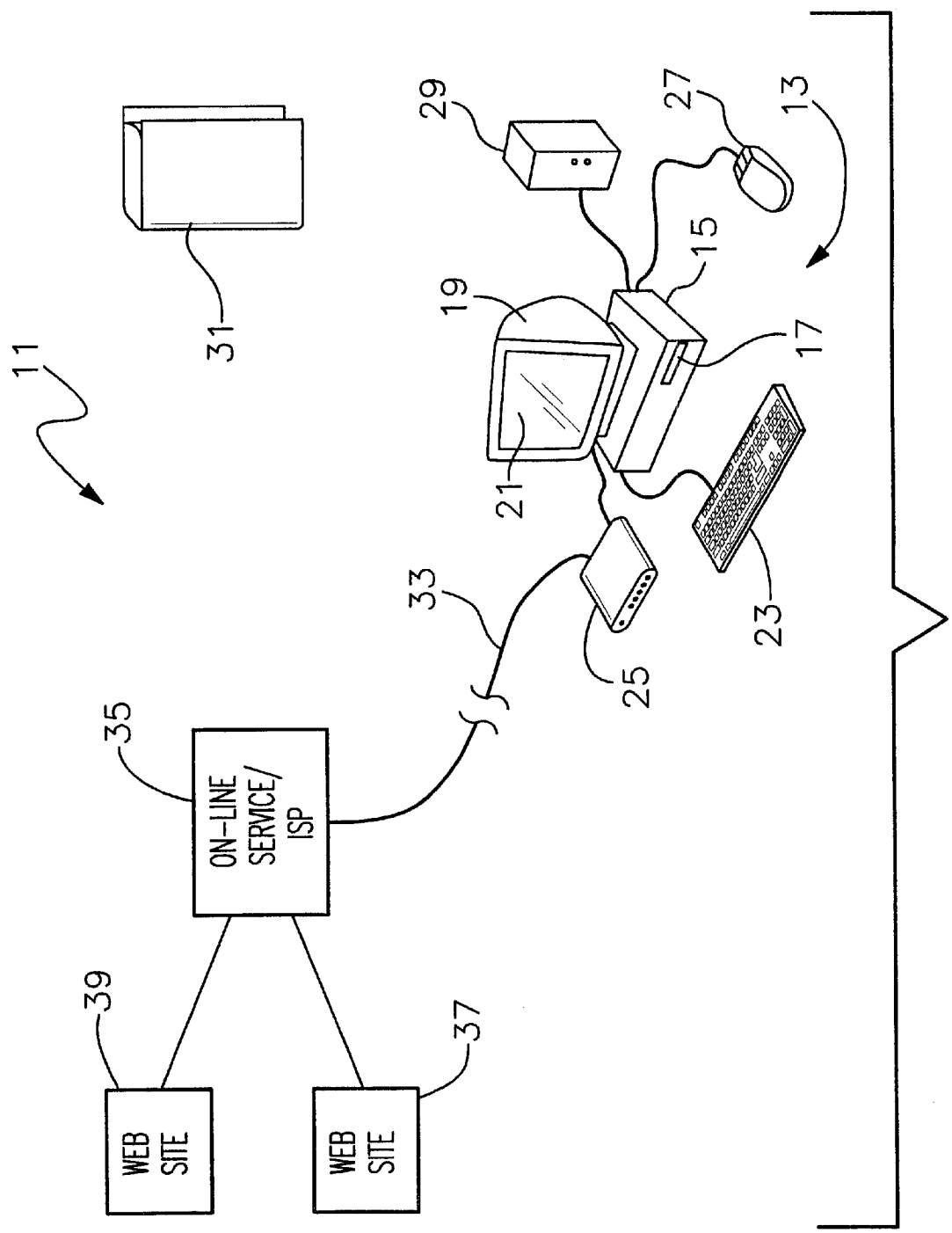
FIG. 1 illustrated one embodiment of a system for promoting interest in a particular websit in accordance with the teachings of the present invention.

Referring to FIG. 1, one embodiment of a system for promoting interest in a particular website in accordance with the teachings of the present invention is generally illustrated at 11. The system 11 includes a general computer at 13 having a processing unit 15 containing microprocessor (not shown) and a memory storage device such as a hard-drive 17. A plurality of input/output peripherals are connected to the processing unit 15 including a monitor 19 having a screen 21, keyboard 23, modem 25 for connecting the computer 13 to the Internet, mouse 27 and printer 29. The system 11 further includes an article of manufacture 31, such as, for example, a book, that is distributed in incomplete form and completed by accessing a specific website on the Internet to obtain the missing part of the article of manufacture 31 as will be more fully discussed hereinafter.

Modem 25 is connected to a telephone line 33 as well as computer 13 and connects the computer 13 with a POTS/Centrex telephone line in a manner-known and standard to modems. The modem 25 may alternatively be connected via ISDN, leased line, cable modem as well as satellite. An on-line service 35 is also connected to the phone network. Preferably, the on-line service 35 is an Internet Service Provider (ISP) which is capable of connecting the general computer 13 to the Internet via modem 25. The on-line service 35 is at a physical location remote from the computer 13 and via the telephone line 33 allows the computer 13 to connect with any one of a plurality of Internet websites 37, 39 that are stored on computers (not shown) remote from the other components of the system 11. Distributed with the incomplete article of manufacture 31 are instructions directing the recipient to access the specific website being promoted in order to obtain the missing part of the article of manufacture.

The present invention also includes a method for promoting interest in a website which, in accordance with the teachings of the present invention, comprises the steps of connecting a computer to the Internet at a specific address, the computer storing a website with information which the owner of the website desires to be accessed by the public and distributing an article of manufacture, such as, for example, a book, in incomplete form. With the article of manufacture, the address of the website being promoted is provided along with instructions directing the recipient of the incomplete article of manufacture to access the website at the specific address on the Internet to obtain the missing part of the article of manufacture. The recipient then accesses the website and views, downloads and/or prints out the missing part of the article of manufacture.

Figure 2:
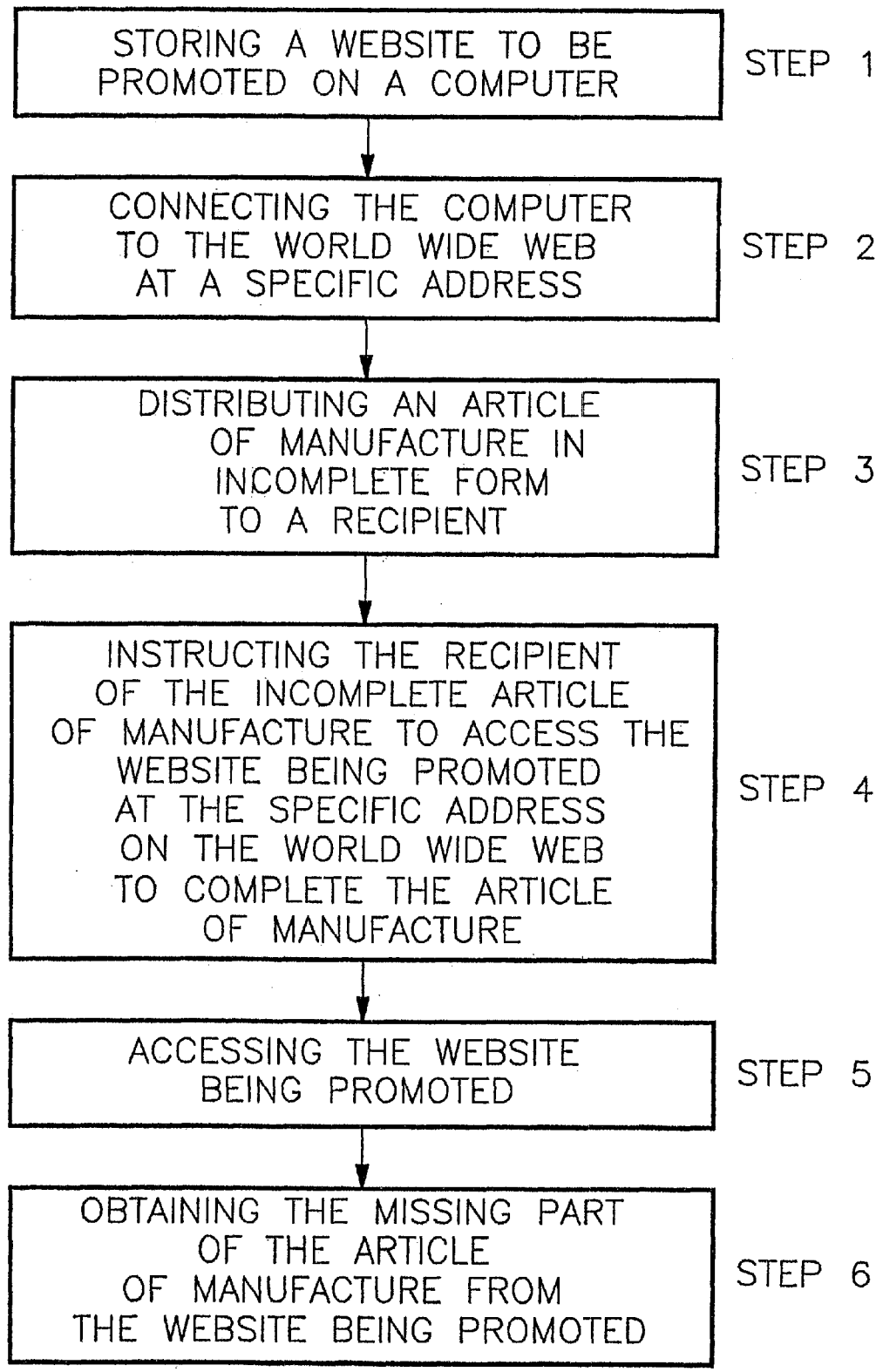
FIG. 2 is a block diagram illustrating one embodiment of a method for promoting interest in a particular website in accordance with the teaching of the present invention.

Referring to FIG. 2, a block diagram illustrates one embodiment of the method of the present invention. In step one, a website to be promoted is stored on a computer. In step 2, the computer is connected to the Internet at a specific address. In step 3, an article of manufacture is distributed to a recipient and in step 4, the recipient is instructed to access the website being promoted at the specific address on the Internet in order obtain the missing part of the article of manufacture. In step 5, the recipient accesses the website being promoted and in step 6, the missing part of the article of manufacture is obtained.

The website owner or sponsor(s) of the website being promoted may be interested in having the recipient of the incomplete article of manufacture view certain information or advertising before the recipient can obtain the missing part of the article of manufacture. In which case, the website is constructed in such a manner that the recipient of the incomplete article of manufacture must navigate through a series of different web pages containing the information or advertising that is desired to be viewed before arriving at the web page at which the missing part of the article of manufacture is obtained.

Figure 3A:
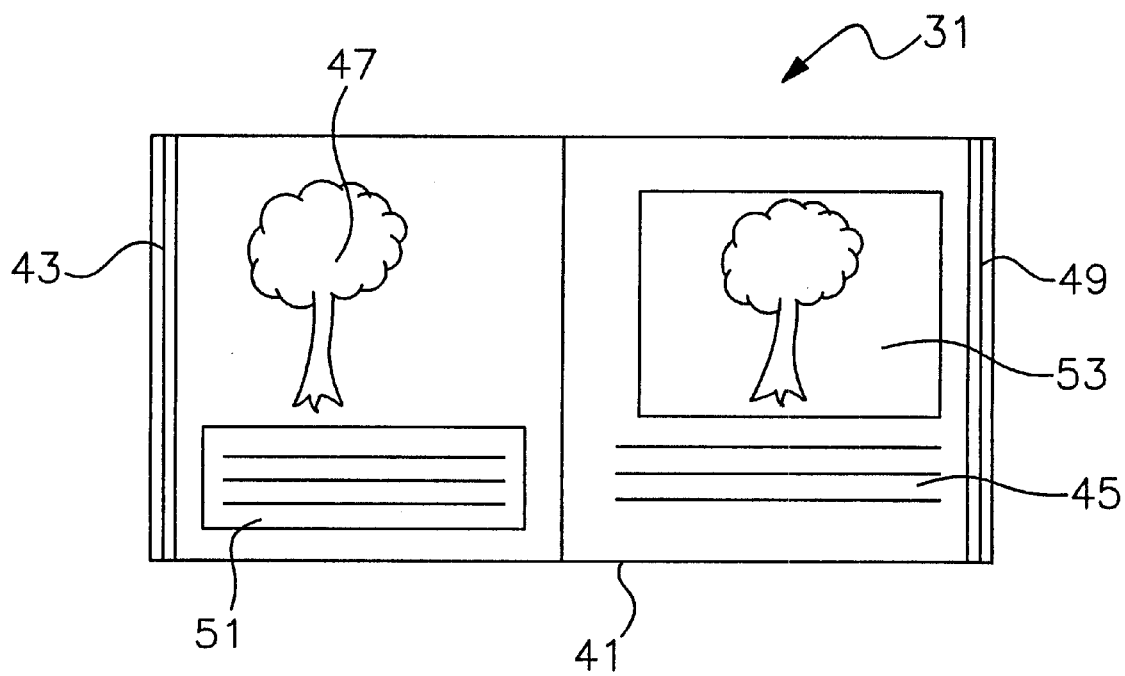
FIGS. 3A–3C illustrate different embodiments of the incomplete article of manufacture in accordance with the teaching of the present invention.
Figures 3B, 3C:
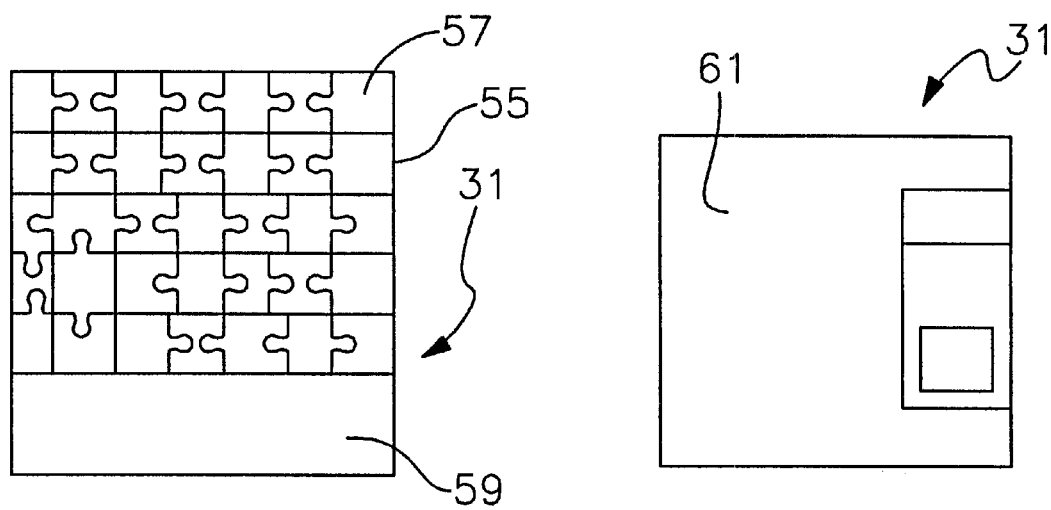

Referring to FIGS. 3A–3C, different embodiments of the incomplete article of manufacture are illustrated in accordance with the teaching of the present invention. As seen in FIG. 3A, the article of manufacture 31 comprises a book 41 having a series of pages 43 which may include text 45 as well as illustrations 47. As previously noted, the article of manufacture 31 is distributed in incomplete form, for example, it may tell a story but fail to include an ending. Alternatively, one or more pages 43 of the book 41 may be missing or specific text 45 or illustrations 47 on one or more pages may be missing. In the case of missing pages 43, the recipient completes the book 41 by accessing the website being promoted and printing out the missing page or pages 43 using the printer 29, for example a color printer, connected to the recipient's computer 13. If specific text 45 or illustrations 46 are missing, then a clean sheet of paper 49 having adhesive backing can be provided with the article of manufacture 31 and inserted into the printer 29 of the recipient's computer 13. The missing text 45 is printed on the adhesive backed paper 49 and removed by the recipient to form a text sticker 51 which is then pasted into the book 41 on the page 43 having the missing text. Similarly, missing illustrations 47 are printed on the adhesive backed paper 49 and cut out by the recipient to form an illustration sticker 53 which is pasted into the book 41 on the page 43 having the missing illustration. Alternatively, the missing text or illustrations are printed on a plain sheet of paper, cut out and pasted into the book 41 in a conventional manner.

As noted above, the book 41 may tell a story having an end which is missing and which requires the reader to make certain choices which effect the outcome of the story in an interactive way. In this case, the recipient accesses the website being promoted, inputs the choices made by the reader and then is shown one of a plurality of different outcomes which depend on the choices made by the reader. These different endings can then be displayed as an animation on the screen 21 of the monitor 19 of the recipient's computer 13 or printed out on the printer 29 as fully pages or missing text and/or illustrations which are the incorporated into the book 41 to complete it.

According to a further embodiment, the article of manufacture 31 comprises an incomplete puzzle 55 having a plurality of puzzle pieces 57, the missing puzzle pieces 59 being obtained from the website being promoted and printed out on a sheet of paper by printer 29 of the recipient's computer 13. The missing puzzle pieces 59 are then cut out from the sheet of paper and then used to complete the puzzle 55.

According to yet another embodiment, the article of manufacture 31 comprises a computer readable storage device 61 which stores a computer readable program provided in incomplete form. The recipient of the storage device 61 obtains the missing portion of the computer program by downloading it from the website being promoted and storing it on the storage device 61 or on the hard-drive 17 of the recipient's computer 13.

Although the invention herein has been described with reference to particular embodiments, it is understood that the embodiments are merely illustrative of the principles and application of the present invention. It is therefore to be understood that numerous modifications may be made to the embodiments and the other arrangements may be devised without departing from the spirit and scope of the present invention as defined by the appended claims.

What is claimed is:

1. A method for promoting interest in a website on the Internet, the method comprising the steps of:

storing the website to be promoted on a computer;

connecting the computer to the Internet at a specific address;

distributing an incomplete article of manufacture to a recipient with a missing part that comprises a sheet to be adhered to the article of manufacture;

instructing the recipient of the incomplete article of manufacture to access the website being promoted at the specific address on the Internet in order to obtain the missing part and complete the article of manufacture.

2. A method according to claim 1, further comprising the steps of:

accessing the website being promoted; and obtaining the missing part of the article of manufacture at the website being promoted.

3. A method according to claim 2, wherein the step of obtaining the missing part of the article further comprises the step of requiring the recipient to access at least one web page of the website having viewable information before accessing a web page of the website at which the missing part of the article of manufacture is obtained.

4. A method according to claim 3, wherein the viewable information of the at least one web page includes advertising.

5. A method according to claim 1, wherein the incomplete article of manufacture is one of a book, a puzzle or a computer readable program storage device having a computer readable program stored thereon.

* * * * *